United States Patent [19]

Gongwer

[11] 4,037,615

[45] July 26, 1977

[54] FLUID CONTROL VALVE

[75] Inventor: Calvin A. Gongwer, Glendora, Calif.

[73] Assignee: Innerspace Corporation, Glendora, Calif.

[21] Appl. No.: 623,120

[22] Filed: Oct. 16, 1975

Related U.S. Application Data

[63] Continuation-in-part of Ser. No. 519,606, Oct. 31, 1974, abandoned.

[51] Int. Cl.² ............................................. F16K 47/08
[52] U.S. Cl. ........................................ 137/1; 251/127; 181/53
[58] Field of Search ............... 251/127; 181/36 R, 53, 181/54, 58; 415/205

[56] References Cited

U.S. PATENT DOCUMENTS

| 728,782 | 5/1903 | Tate et al. | 251/127 X |
|---|---|---|---|
| 888,489 | 5/1908 | Gustafson | 181/53 X |
| 965,135 | 7/1910 | Gibson | 181/53 |
| 1,584,315 | 5/1926 | Maxim | 181/53 X |
| 1,778,101 | 10/1930 | Bie | 181/53 |
| 3,131,717 | 5/1964 | Gratzmuller | 251/127 X |
| 3,144,904 | 8/1964 | Kahn et al. | 181/53 X |
| 3,313,518 | 4/1967 | Nancarrow | 415/205 UX |

FOREIGN PATENT DOCUMENTS 506,841  9/1930  Germany .............................. 181/53

Primary Examiner—Arnold Rosenthal
Attorney, Agent, or Firm—Lyon & Lyon

[57] ABSTRACT

A fluid control valve which avoids wear, cavitation, and high noise level operation and yet is substantially non-clogging. The valve includes one or more nozzles through which fluid is passed, thereby producing a fluid jet, the fluid subsequently being spun tangentially within an annular whirl chamber, and then being passed through a labyrinth passageway comprising a series of inwardly spaced concentric sleevelike annuli.

16 Claims, 5 Drawing Figures

FLUID CONTROL VALVE

RELATED APPLICATIONS

This application is a continuation-in-part of U.S. pat application Ser. No. 519,606 filed Oct. 31, 1974 now abandoned.

BACKGROUND OF THE INVENTION

1. Field of the Invention

The present invention relates broadly to a control valve which allows for the flow control of liquids and gases. More specifically, the invention relates to a control valve which is substantially unsusceptible to plugging and which operates, from a fully open to a fully closed position; relatively noiselessly and free from vibration and cavitation.

2. Description of the Prior Art

Conventional control valves simply utilize an adjustable opening in order to control fluid flows. This adjustable opening may be produced for example in a gate valve or globe valve by adjusting the position of a flat plate, or in a ball valve by adjusting the position of a sphere having an opening passing through it, or in a plug valve or needle valve by adjusting, respectively, a tapered plug or a sharply tapered element. All of such valves are susceptible to severe cavitation with attendant excessive noise levels, vibration and valve wear, particularly at high pressure differentials across the valve.

Other valve designs employ a mixing process wherein fluid flows of different energies are combined, thus producing turbulent fluctuations of a large scale as, for example, the design disclosed in U.S. Pat. No. 3,515,158 (G. E. Utz) which issued on June 2, 1970. Such fluctuations may also produce excessive valve operation noise and vibration. It is important that control valves be smoothly adjustable throughout the range from fully opened to fully closed. An indication of this adjustability for liquid handling valves is the $C_v$ value, wherein $C_v$ is defined as follows:

$$C_v = \frac{Q}{\left(\frac{\Delta P}{\delta}\right)^{\frac{1}{2}}}$$

where $Q$ is the flow rate in gallons per minute, $\Delta p$ is the pressure differential in pounds per square inch and $\delta$ is the specific gravity of the fluid handled. It is particularly important that the $C_v$ vary smoothly as the valve is opened, and that the maximum $C_v$ (fully opened position) is sufficiently large to allow for the passage of an adequate amount of fluid. For many applications, a value with a linear relationship between the valve opening and the flow rate passed through the valve is desired. Thus the flow rate would be zero with the valve closed, and the flow rate would increase substantially in direct proportion to the area of valve opening as the valve is opened. Non-linear valves allow for a large change in flow rate with a rather small change in valve opening; the valve thus not being smoothly adjustable and the control of the flow being more difficult as small changes of valve positions produce wide variations in the flow rate. As the pressure decrease across the valve changes as the valve is opened, the change in pressure drop in turn changes the flow rate. This relationship is governed by the valve characteristics as described by the valve $C_v$ at various openings. Referring to the foregoing formula, the flow rate may be determined when $C_v$, $p$ and $\delta$ are determined. While $C_v$ is generally related to liquid handling characteristics, similar term and definition exist for gas flow (often referred to as $C_g$).

Pressure regulating valves of another design employ a whirl chamber in order to lower the fluid pressure. Such "whirl chamber" valves produce severe underpressures (below the downstream back pressure). Such a pressure differential produces cavitation and/or supersonic downstream gas flow. The cavitation and supersonic flow in turn generate high noise levels. The lowering of allowable noise generation intensity levels by the Federal Occupational Safety and Health administration and numerous state and local agencies typify the long felt need for a control valve capable of operating effectively at low noise levels.

Various means having been suggested to make valves relatively noiseless, but without much success, such as by breaking up the flow of fluid by positioning a disc of fine mesh wire, or a pad of fibrous material, in the fluid-connecting passageway, but such constructions often become plugged due to the small openings in such fibrous materials. Particularly troublesome when handling gaseous fluids are "edge tones" produced by passing the gas over a sharp edge. When the gas flow becomes supersonic, the noise produced by such edge tones is even further increased by as much as an order of magnitude. Additionally, many valve designs have cavities which may act as Helmhholtz resonators producing "cavity tones."

Recently developed valving means have successfully utilized a plurality of passages and/or multiple discs in order to make valves relatively noiseless, see for example my U.S. Pat. Nos. 3,133,557 and 3,316,936. However, such valves having a plurality of passages or multiple discs may also become plugged due to the close tolerances within the valves, although to a lesser extent than valves having fine mesh internals.

An object of this invention is to provide a fluid control means which is smoothly adjustable through the operating range from fully opened to fully closed.

An object of this invention is to provide a liquid control valve which is capable of operating without severe cavitation, such cavitation producing excessive noise levels and vibrations.

A further object of this invention is to provide a gas control valve which is capable of operating without severe noise levels and vibration.

An additional object of this invention is to provide for a valve having a design such that underpressures, relative to the downstream back pressure, are not produced thereby generating cavitation with its attendant excessive noise levels and vibration.

A further object of this invention is to provide for a relatively noiseless smoothly operating valve which is not substantially susceptible to clogging by particulate matter.

Further objects and advantages of the present invention will become apparent following a reading of the detailed description, drawings and claims.

SUMMARY OF THE INVENTION

A fluid control valve which avoids wear, cavitation, and high noise level operation and yet is substantially nonclogging which includes one or more nozzles through which fluid is passed, thereby producing a fluid jet with the fluid subsequently being spun tangentially within an annular whirl chamber, and then passed through a labrinth passageway comprising a series of inwardly spaced, concentric sleevelike annuli.

BRIEF DESCRIPTION OF THE DRAWINGS

FIG. 3 is a partial sectional view of the fluid control means.

FIG. 4 is a partial sectional view of the fluid control means.

FIG. 5 shows the $C_v$ characteristics of a valve typical of the valve of this invention shown as a function of valve opening.

DESCRIPTION OF THE INVENTION

Figure 1:
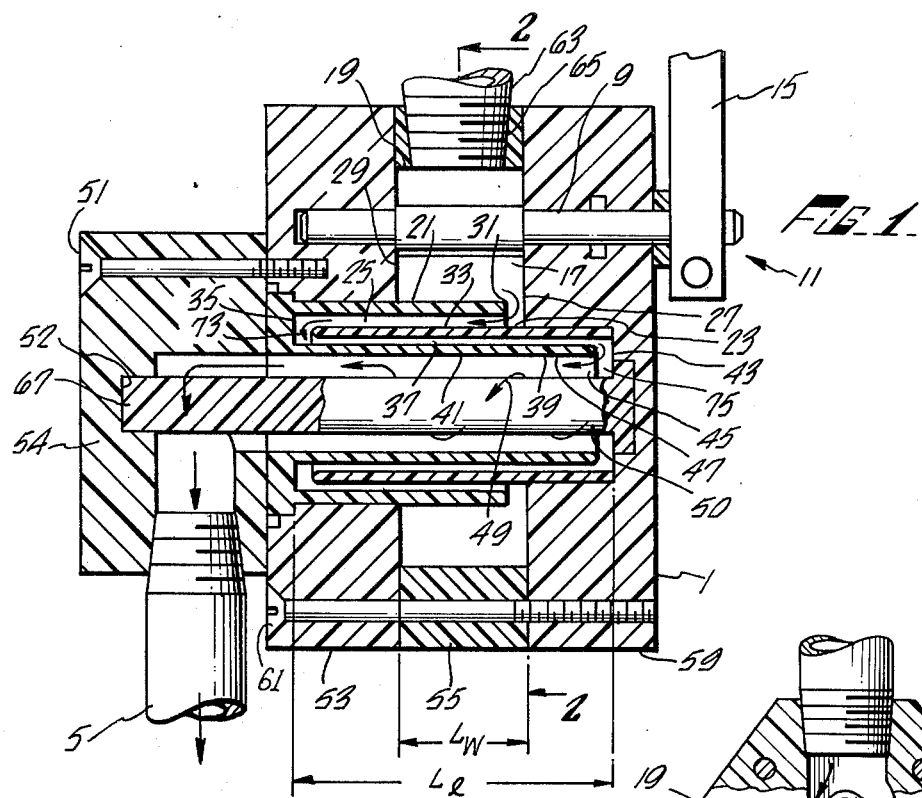
FIG. 1 is a sectional view of the fluid control means.

A portion of pressure to be dissipated is converted into kinetic energy via the production of a fluid jet which which exits at the nozzle formed by the opening of at least one inlet valve such as a butterfly element or member, thereby creating a converging accelerating orifice. The jet formed is tangent to an annular whirl chamber in which it builds up a strong vortex whereby a major portion of the pressure drop is produced by an increase in the tangential velocity.

The liquid or gas is then led into a labrinth of concentric sleeves or annular passages, preferably longer than the whirl chamber length, in which the very high whirl component of velocity represents in kinetic form the energy to be dissipated by means of pressure drop. This whirl component is therein reduced by hydraulic or fluid friction on the walls of these passages without affecting the thru-flow component. Thus the fluid follows a long labyrinth passageway wherein the tangential component may be dissipated. The axial component of velocity is fixed by the total flow through the valve and is not affected by this process. This may be accomplished by increasing the spacing between the annular walls as the radii are decreased so as to maintain a constant cross-sectional area. The axial component is much smaller than the whirl component except at the outlet where the "quiet" fluid is released to the exit. An outlet approximately 60° to about 120°, and preferably about 90°, relative to the axial component may be utilized at the downstream end of the valve to eliminate any remaining whirl if this is necessary.

As the valve means shut-off where the throttling job is usually the most difficult, the time required to traverse the helical path of the flow becomes much longer because the thru-flow component is reduced. The $C_v$ characteristics of a valve typical of the design of this invention is shown in FIG. 5 as a function of valve opening. Also shown as a function of valve opening in FIG. 5 is the ratio of axial energy ($P_a$) dissipated in a typical valve of the present invention as compared with the total energy ($P_t$) dissipated in the valve. FIG. 5 also shows the ratio of pressure drop across an inlet valve ($\frac{1}{2} V_s^2$) compared with $P_t$ for a valve typical of the present invention. The ratio of $P_a$ to $P_t$ indicates that the axial or thru-flow kinetic energy increases as the valve is opened from very small values at small openings. The drop across the inlet valve is shown to decrease with valve opening. For a more detailed description of typical fluid flow measurements, see D. G. Shepard, *Elements of Fluid Mechanics,* pp. 113–187, Harcourt, Brace & World, Inc. (1965) and D. G. Shepard, *Principles of Turbomachinery,* Macmillan (sixth ed. 1965)

The fluid experiences no sudden changes of direction or protuberances in the direction of the whirl component so there are almost no dynamic underpressures which would cause cavitation (in the case of liquids). At each reduction in diameter until the exit concentric passage is reached, there is a whirl component step-up in the inverse ratio of the radii and a further drop in pressure. This assists in the reduction of the whirl energy by friction losses. As the valve has no cavities or sharp edges, no cavity tones or edge tones are produced.

The cyclindrical flow passages can be given roughness to assist in dissipation of the whirl component, axial scratches, grooves, sand blasted, etc. The roughness can be progressive from rough at the upstream end of the cylindrical passages to smooth at the downstream end where the pressure is lowest and the tendency to cavitate is greatest.

For larger valves, the walls of the annular passages may be covered with a smooth compliant elastomeric or rubber-like skin. Such a skin damps turbulent boundary layer velocity and pressure fluctuations, thus reducing noise in the control of gaseous fluids and reducing friction in both gas and liquid handling. The increased whirl velocities which will result from this lowering of the wall friction will allow the whirling action in the vortex chamber to maintain down to very near shut off.

A further contemplated use for a valve of the design of this invention is as an exhaust muffler for internal combusion engines. The high speed whirl will moderate pressure fluctuations resulting from the intermittent nature of engine exhaust. The valve would preferably be used in this low pressure application with a multiplicity of inlet valves arranged around the periphery of the valve. Such inlet valves may be adjusted for various engine loads.

The thru-flow area can be adjusted to control the thru velocity and hence the residence time of the fluid in the passages. Also the total axial length, the number of passages arranged concentrically, and the clearance in the passages can be arranged as found to be appropriate.

The valve is suitable for very high pressures and pressure drops. The valve is also adaptable for actuation by any of the standard valve controlling devices now used on other valves, but it will be much easier to operate because of its balanced nature and smaller less powerful control units can be used. In order to take out possible backlash in the movement of the control butterfly valve (or valves), it may be made slightly unbalanced so the pressure is always urging it in one direction. It is understood that other types of valve elements that the butterfly valve can be used. Among these are modified gate and plug valves, cam and lever, etc.

Figure 2:
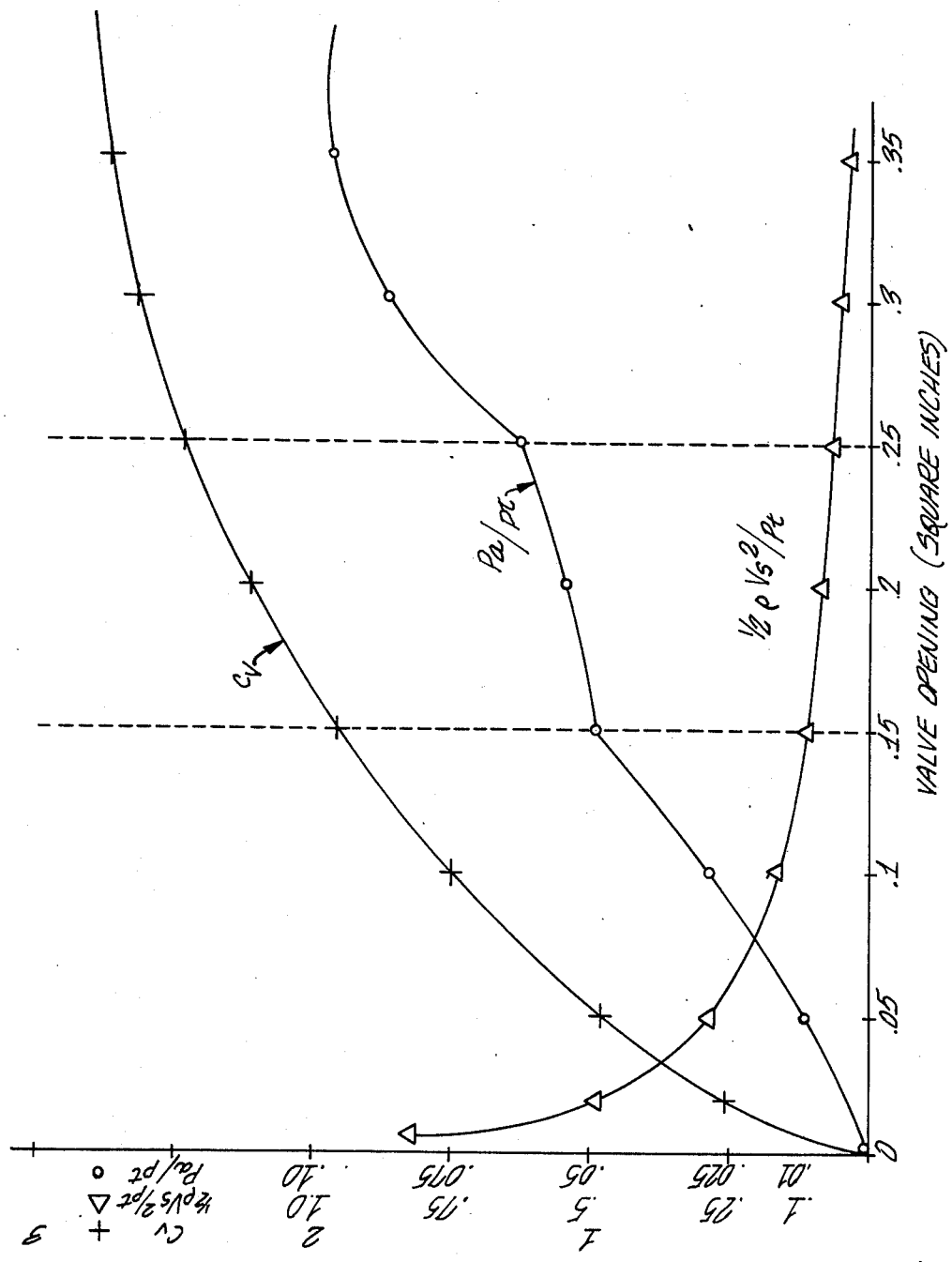
FIG. 2 is a sectional view of the fluid control means taken through 2—2 of FIG. 1.

Referring now to FIG. 1, the fluid control valve includes a housing 1 having an inlet 3 and an outlet 5. Flow through the inlet 3 and into the housing 1 is regulated by a balanced or slightly unbalanced inlet butterfly valve 7 which may be rigidly mounted about a shaft 9. This inlet valve 7 and the shaft 9 are more clearly shown in FIGS. 2 through 4, where the inlet valve 7 is shown in a variety of operating positions. In FIG. 3 the valve is passed the full open position in that the passage no longer converges to the exit lip. In this position the whirl is largely stopped by the projection of the valve edged down into the whirl chamber. A flush-thru or blow down occurs at this degree of opening.

Referring now again to FIG. 1, the control means, generally referred to as 11, controls the position of the inlet valve 7 which rotates with the shaft 9. The shaft 9 may be attached to a valve positioner 15 such that a change brought about by rotating valve positioner 15 rotates the shaft 9 thereby actuating the inlet valve 7. The fluid once having passed through a nozzle opening 79 formed by a cylindrical wall 19 and the inlet valve 7 enters into an annular whirl chamber 17 formed by the cylindrical outer wall 19 and the cylindrical inner walls 21 and 23. Abutting the 21 and 23 walls are the faces 29 and 27 which direct the flow into an opening 31, and into an annular space 33 formed by cylindrical inner wall surfaces 25 and 23. Fluid directing face 35 abuts the surface 25 and further directs the flow through an opening 73 and into an annular space 37 bounded by cylindrical wall surfaces 39 and 41. Finally, a surface 43, abutting the wall 39 surface, further directs the fluid flow into an annular space 45 through an opening 75 bounded by cylindrical surfaces 47 and 49 the outer surface of a rod member 50. Fluid flow passes axially down the length of annular space 45 and outward through housing exit 5. In order to decrease any remaining whirl component, the housing exit 5 may be positioned at right angles to the axial flow from the valve and the rod member 50. Preferably, the length of the whirl chamber, $L_w$, is now less than the length of the labrinth passageway, $L_l$. As the radius of the axial flow decreases as the fluid nears the center of the space between the annular walls or sleeves may be increased in order to produce a cross-sectional area which is approximately constant.

In a preferred embodiment inlet valve 7 may be a slightly unbalanced butterfly valve pivoting about the center of shaft 9.

As further illustrated in FIG. 1, housing exit 5 may be attached to the housing 1 by means of a screw 51. Additionally, housing 1 may be comprised generally of three subassemblies 53, 55 and 59 which may be fastened by means of screw 61. Further defining the inlet 3, the inlet number may be adopted with external threads 63 which screw into internal threads 65 provided in the housing 1. Further defining the inner annular space 45, a face 67 seals the discharge end of cylindrical surface 49. Furthermore, the rod member 50 may be inserted within the recess 52 found in the housing 54 which joins the exit 5. Alternately, a plurality of struts 71 may be utilized to position the rod member 50.

While a single inlet valve is shown in FIGS. 1-4 it is understood that a multiplicity of valves may be arranged around the outer part of the annular whirl chamber and be controlled together as in the wicket gates of a hydraulic turbine. The invention is not limited to a single admission valve. Having fully described my invention, it is to be understood that I do not wish to be limited to the details herein set forth, may invention including modifications which may be made by others skilled in the art without departing from the scope of the claims appended hereto.

I claim:
1. A fluid control means comprising
   a housing means providing an axially extending outer wall and a plurality of inner walls, said outer and inner walls in inwardly spaced concentric annular relation, said annular walls having gradually decreasing diameters;
   a housing inlet open to an outer annulus formed between said outer wall and the inner wall next adjacent said outer wall;
   means for dissipating fluid flow energy having a valve nozzle means for introducing and tangentially accelerating varying amounts of fluid into said outer annulus and tangential to said outer wall and a means for directing and further tangentially accelerating said fluid having passed through said outer annulus through the series of annuli formed by said inwardly spaced concentric inner walls; and
   an annular exit being formed by the innermost wall and the next adjacent inner wall.
2. The fluid control means claimed in claim 1 wherein said fluid directing means comprises:
   a conduit means joining said series of annuli, each of said annuli having an entrance and an exit at opposite ends thereof, such that the exit of each of said annuli is connected to the entrance of the next smaller annulus, thereby providing a labyrinth passageway for said fluid such that fluid passes along the lengths of progressively smaller annuli alternately in a first direction and then in a direction opposite to said first direction.
3. The fluid control means claimed in claim 1 wherein the surface of said annuli of said labyrinth are progressively smoother as measured from said outer annulus to said annular exit.
4. The fluid control means claimed in claim 1 wherein the surface of said annuli comprises a compliant elastomeric skin.
5. The fluid control means claimed in claim 1 wherein said housing exit is further defined as housing exit means for reducing fluid tangential velocity positioned with its centerline between about 60° and about 120° relative to the centerline of said annuli.
6. The fluid control means as claimed in claim 1 wherein said valve nozzle means comprises:
   at least one member pivotally mounted at the approximate center of said member, said member pivoting adjacent said outer wall, and being mounted between said outer wall and said inner wall next adjacent said outer wall.
7. A method of fluid control comprising;
   regulating the amount of said fluid entering said annular whirl chamber;
   accelerating a fluid tangentially about an annular whirl chamber, and thereby decreasing the fluid pressure and dissipating the fluid flow energy;
   accelerating and gradually decreasing the annular flow path diameter and further tangentially spinning said fluid through a series of inwardly spaced concentric annuli, thereby further decreasing the fluid pressure and dissipating the fluid flow energy; and
   discharging said fluid from the inwardmost annulus.
8. The method of fluid control claimed in claim 7 wherein the path produced by said series of inwardly spaced concentric annuli becomes progressively smoother as measured toward the innermost annulus.
9. The method of fluid control means claimed in claim 7 wherein the surface of said annuli comprises a compliant elastomeric skin.
10. The method of fluid control means claimed in claim 7 wherein said method is further described as discharging said fluid at an angle of 90° relative to said annuli.
11. The method of fluid control claimed in claim 7 wherein said regulating is accomplished by means of at least one member pivotally mounted at the approximate center of said member, said member being mounted at an inlet to said annular whirl chamber.

12. A fluid control means comprising;
   a housing means providing an axially extending outer wall and a plurality of inner walls, said outer and inner walls in adjacent inwardly spaced concentric annular relation and thereby forming a passageway of a series of annuli;
   a housing inlet open to an outer annulus formed between said outer wall and the inner wall next adjacent said outer wall;
   valve nozzle means adapted to introduce varying amounts of fluid into said outer annulus and tangential to said outer wall;
   conduit means for directing said fluid having passed through said outer annulus through said passageways of the series of annuli formed by said inwardly spaced concentric inner walls having gradually decreasing diameters, said conduit means joing said series of annuli, each of said annuli having an entrance and an exit at opposite ends thereof, such that the exit of each of said annuli is connected to the entrance of the next smaller annulus, thereby providing a labyrinth for said fluid such that fluid passes along the lengths of the progressively smaller annuli alternately in a first direction and then a second direction opposite to said first direction.

13. The fluid control means claimed in claim 12 wherein the surface of said annuli of said spiral path are progressively smoother as measured from said outer annulus to said annular exit.

14. The fluid control means claimed in claim 12 wherein the surface of said annuli comprises a compliant elastomeric skin.

15. The fluid control means claimed in claim 12 wherein said housing exit is further defined as housing exit means for reducing tangential velocity positioned with its centerline between about 60° and about 120° relative to the centerline of said annuli.

16. The fluid control means as claimed in claim 12 wherein said valve nozzle means comprises:
   at least one member pivotally mounted at the approximate center of said member, said member pivoting adjacent said outer wall, and being mounted between said outer wall and said inner wall next adjacent said outer wall.

* * * * *